US010122752B1

(12) United States Patent
Soman et al.

(10) Patent No.: US 10,122,752 B1
(45) Date of Patent: Nov. 6, 2018

(54) DETECTING AND PREVENTING CRYPTO-RANSOMWARE ATTACKS AGAINST DATA

(71) Applicant: VMware, Inc., Palo Alto, CA (US)

(72) Inventors: Sisimon Soman, Sunnyvale, CA (US); Matthew Conover, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 173 days.

(21) Appl. No.: 15/179,508

(22) Filed: Jun. 10, 2016

(51) Int. Cl.
*G06F 21/64* (2013.01)
*H04L 29/06* (2006.01)
*G06F 17/30* (2006.01)

(52) U.S. Cl.
CPC ...... *H04L 63/1441* (2013.01); *G06F 17/3012* (2013.01); *G06F 17/30082* (2013.01); *G06F 17/30109* (2013.01); *H04L 63/1416* (2013.01)

(58) Field of Classification Search
CPC .......... G06F 21/64; G06F 21/51; G06F 21/57; G06F 2221/2107; G06F 21/575
USPC ....................................................... 713/187
See application file for complete search history.

(56) References Cited

U.S. PATENT DOCUMENTS

2007/0162510 A1* 7/2007 Lenzmeier ........ G06F 17/30233

OTHER PUBLICATIONS

Whitham ("Automating the Generation of Fake Documents to Detect Network Intruders");pp. 103-118; "The Society of Digital Information and Wireless Communications, 2013 (ISSN: 2305-0012)".*
Ben Whitman, "Automating the Generation of Fake Documents to Detect Network Intruders", International Journal of Cyber-Security and Digital Forensics (IJCSDF) 2(1), The Society of Digital Information and Wireless Communications, 2013 (ISSN: 2305-0012), pp. 103-118.
Unknown, "FindNextFile function", Microsoft, Inc., Copyright 2016, 3 pages.

* cited by examiner

*Primary Examiner* — Evans Desrosiers (57) ABSTRACT

Embodiments perform detection and prevention of unauthorized access to files in a target folder. A filter driver, interfacing with a target folder, intercepts a first request from a process to access a file in the target folder. The filter driver returns a virtual file, along with the existing files, to the process. Upon receiving a second request from the process to write to the virtual file, the filter driver designates the process as a hostile process and prevents further access attempts.

20 Claims, 9 Drawing Sheets

| REPRESENTATION OF TARGET FOLDER 210 | |
| --- | --- |
| NAME | HIDDEN PROPERTIES |
| PRESENTATION.PPT | REAL |
| RESUME.DOC | REAL |
| TERM_PAPER.DOC | REAL |
| BUDGET.XLS | REAL |
| VACATION.JPG | REAL |
| NEW_YEAR_RES.DOC | REAL |
| SHOPPING_LIST.DOC | REAL |
| SLIDESHOW.PPT | REAL |

AS PRESENTED TO PROCESS BEFORE TRIGGERING EVENT

| REPRESENTATION OF TARGET FOLDER 210 | |
| --- | --- |
| NAME | HIDDEN PROPERTIES |
| FINANCIAL_DATA.DOC | VIRTUAL |
| PRESENTATION.PPT | REAL |
| RESUME.DOC | REAL |
| TERM_PAPER.DOC | REAL |
| BUDGET.XLS | REAL |
| VACATION.JPG | REAL |
| NEW_YEAR_RES.DOC | REAL |
| SHOPPING_LIST.DOC | REAL |
| SLIDESHOW.PPT | REAL |

AS PRESENTED TO PROCESS AFTER TRIGGERING EVENT

DETECTING AND PREVENTING CRYPTO-RANSOMWARE ATTACKS AGAINST DATA

BACKGROUND

Some existing systems are vulnerable to attacks to software operating on the systems from crypto-ransomware or other malware (e.g., "hostile processes"). The attacks by hostile processes are transmitted over a network or by an infected device connected to the system, such as via a universal serial bus (USB) device. These attacks are frequently referred to as "zero day attacks." Zero day attacks rely on a vulnerability or "hole" in the software that is unknown to the vendor of the attacked software. The security holes are then exploited before the vendor provides a fix to the vulnerability, in some examples in the form of an update.

For example, a hostile process may be transmitted to a machine by email, downloaded in a cookie from a website, or uploaded as a file from the USB device. Once the hostile process accesses the device, it searches for files of interest, such as documents, spreadsheets, presentation files, and other personal or business files. Then the hostile process compromises the files of interest by encrypting them using a per user unique key. When a user attempts to open the compromised files later, a warning is displayed that the file is encrypted. The warning provides further instructions for the user to send ransom money (e.g., to a given virtual currency wallet) to decrypt the attacked file. Because most of those transactions are based on virtual currency, it is difficult to track the source of the hostile process. Many users maintain their files of interest in specific folders, such as user profile document folders or other user profile folders. Consequently, files under these user profile folders are more vulnerable to attacks.

With some existing solutions, anti-virus software relies upon signatures to identify and combat hostile processes. However, anti-virus signatures are less effective for the zero day attacks described above, because anti-virus software and databases do not have signatures for new hostile processes such as described above. Other existing solutions use behavior detection-based solutions to identify a pattern of unusual or suspicious process activity, like a series of encryption and disk writes. However, by the time the behavior detection-based solution recognizes the suspicious activity, some of the attacked files will already be encrypted.

SUMMARY

One or more embodiments described herein disclose a system and method performed by a component, such as a file system filter driver, to present, to a process, a virtual file as a first file in a set of files in a target folder. The filter driver detects a request, from the process, to modify the virtual file. Based upon the request, the filter driver designates the process as a hostile process, and issue an alert that the hostile process is detected.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Embodiments described herein protect documents from attack from hostile processes. In some examples, an executable routine (e.g., a filter driver executed by an operating system) returns a virtual file (e.g., as the first file in a sorted set of files) generated in response to a search query from a process. Upon receiving a request from the process to write to the virtual file, the process is identified as hostile, an alert may be issued, and data writes by the process are disabled (e.g., writes to the entire file system or just a particular set of folders). Policies established, disseminated, or otherwise federated by users or administrators include other responses, such as termination of further queries, termination of the connection to the process, suspension of all processes, etc. While some embodiments describe implementation of the disclosure with reference to a filter driver executed by an operating system, other embodiments contemplate other implementations. Aspects of the disclosure are operable with any logic or routine that intercepts queries from a process to access data (e.g., directories, files, etc.), that returns a virtual file to the requesting process, that detects attempted writes by the process to the virtual file, and that interprets the attempted writes as an attack against the data.

Aspects of the disclosure improve detection and prevention of hostile attacks from zero-day ransomware, which existing anti-virus software cannot detect prior to data being compromised because the existing anti-virus software lacks a malware signature for the ransomware. Additionally, existing anti-virus software is difficult to scale to enterprise level virtual environments because of performance problems. The disclosed method scales to an enterprise level, and allows communications between potential target machines within the enterprise level virtual environment.

Further, the disclosed method identifies hostile processes without compromising any file data and without ransom payments to the operators of the hostile processes. Some existing solutions in the market may check for read, encryption, and write-back loops on some files but, once these existing systems detect an attack by the hostile process, some of the files are already encrypted and require time, money, and effort to decrypt. In contrast, the disclosed method determines that the process is hostile based upon the attempt to alter the virtual file, before any of the user files are encrypted, thus preventing a loss of attacked file data and attendant resource costs to resolve the loss.

Unlike most existing anti-virus software, the disclosed method operates without consuming additional disk space or memory on the target machine (e.g. a host computing device), because the virtual file is presented to potentially hostile processes by the file system filter driver, without creating an actual file, in some examples. In such examples, no actual file is created in the target directory. Further, the virtual file is hidden from users and thus is not confusing to them, and the disclosure is not susceptible to accidental triggering by a user accessing those files.

Additionally, the disclosed embodiments are part of a file system filter driver and thus consume little additional storage and memory resources. As an example, the disclosed method operates on the New Technology File System (NTFS) and File Allocation Table (FAT) system, or any other WINDOWS brand file system that supports the that supports the development and installation of file system filters. Likewise, the disclosed method operates with filter drivers on other operating systems, such as Linux variants like Ubuntu and Red Hat.

As a result, the disclosed method improves processor security, reduces required resource allocation, improves user efficiency, and maintains file integrity.

Figure 1:
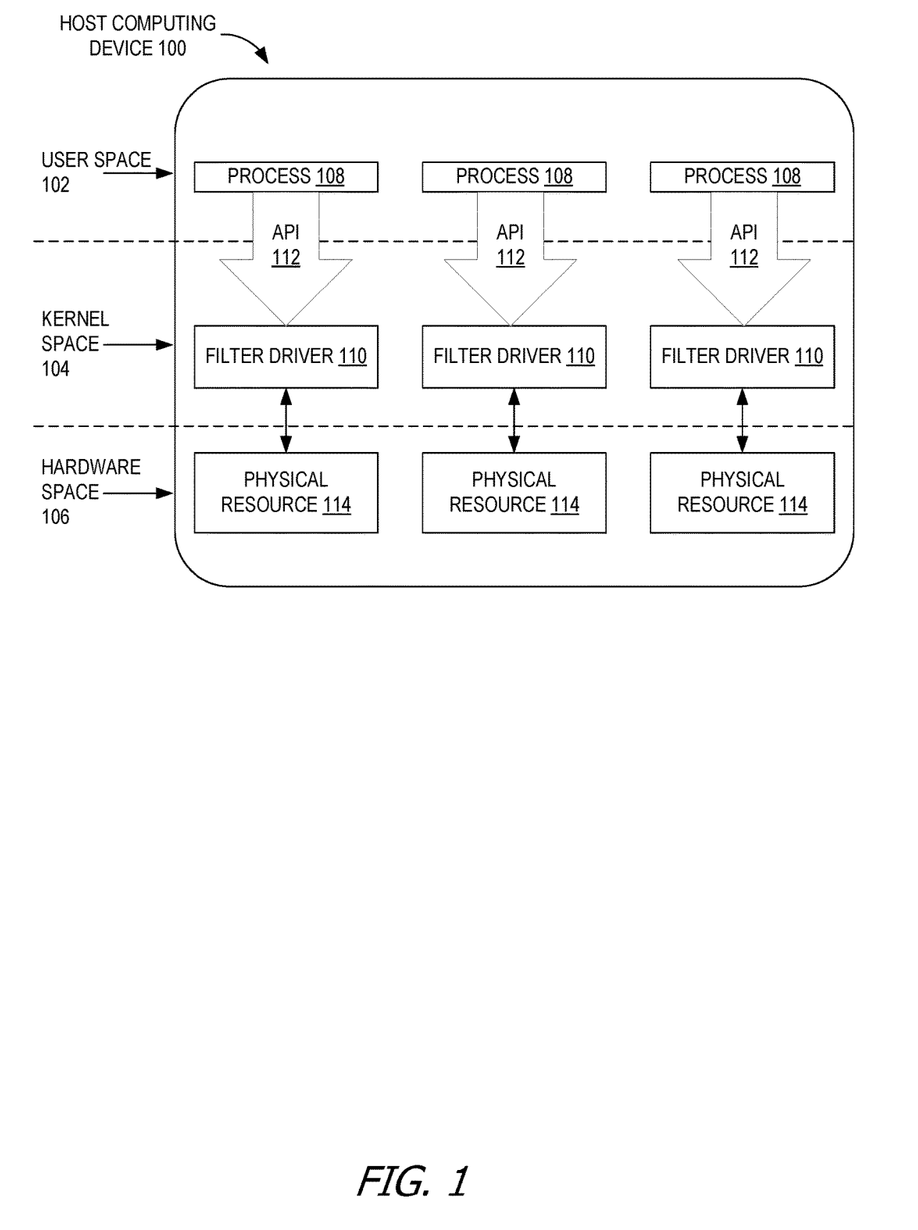
FIG. 1 is a block diagram of an exemplary host computing device for implementing the disclosed method to detect and prevent crypto-ransomware attacks.

FIG. 1 is a block diagram of an exemplary host computing device for implementing the disclosed method to detect and prevent crypto-ransomware attacks. The host computing device 100 disclosed in FIG. 1 is illustrated with three exemplary spaces, a user space 102, a kernel space 104, and a hardware space 106.

Figure 9:
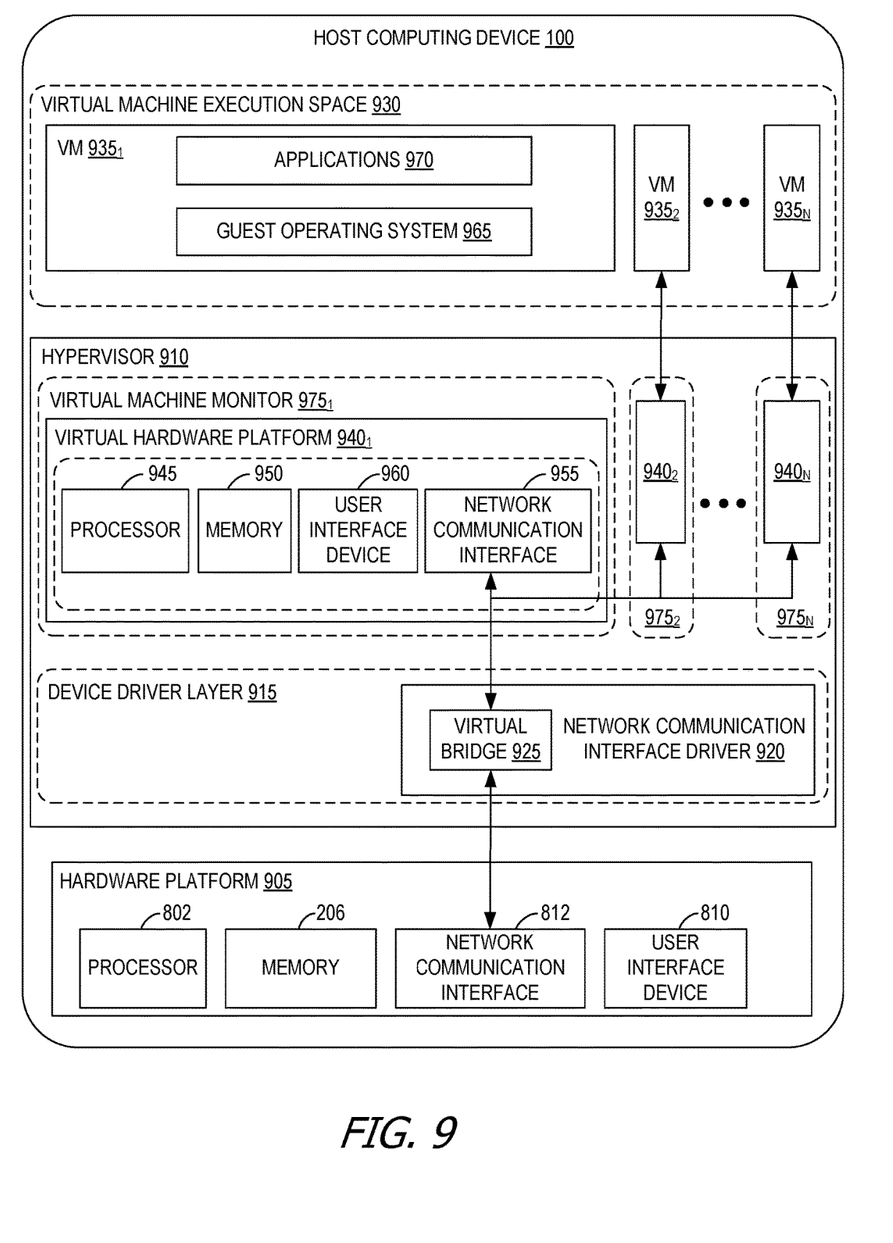
FIG. 9 is a block diagram of virtual machines that are instantiated on a computing device, such as the host computing device shown in FIG. 8.

Various processes 108 operate on the user space 102. The processes 108 correspond to, in some examples, user applications (such as illustrated in FIG. 9). As an example, a user operates a word processing application to make edits to a document. The word processing application, or any other related application, operating system (OS), or other component, calls functions, such as via an application programming interface (API) 112 implemented by the operating system (not illustrated), which in turn interface with the filter driver 110 (e.g. a file system filter driver). In this manner, processes 108 communicate from the user space 102 to the kernel space 104.

At the kernel space 104, the filter driver 110 is a driver in the input/output (I/O) path that is before the other drivers that communicate with the physical resources 114 at the hardware space 106 to access and alter data. The filter driver 110, by routing requests through other drivers downstream in the I/O path, may also retrieve data, such as the contents of a folder or directory, from the physical resources 114 such as storage devices. The filter driver 110 returns the data, information, or result to the operating system, which returns it to the processes 108 associated with the applications.

In the disclosed system and method, the filter driver 110 operates at the kernel space 104 and responds to requests from processes 108 to access folders (e.g. "target folders") on the physical resources 114. In responding to the requests, the filter driver 110 creates a virtual file (if such a file has not been previously created), and presents it with the other contents of the target folder. The virtual file is hidden from users, and is spoofed to the requesting process 108: it does not exist in persistent storage (e.g., it is not saved to memory or a storage device). Attempts to tamper with the virtual file by writing to it, encrypting it, or otherwise accessing it are interpreted by the filter driver 110 as attacks, and the requesting process 108 is classified as a hostile process. The filter driver 110 may issue an alert after classifying the process 108 as a hostile process, and in some examples executes a protocol or policy. In some examples, the protocol or policy includes instructions to lock the target folder, suspend operations, terminate hostile process or other instructions.

Figure 2:
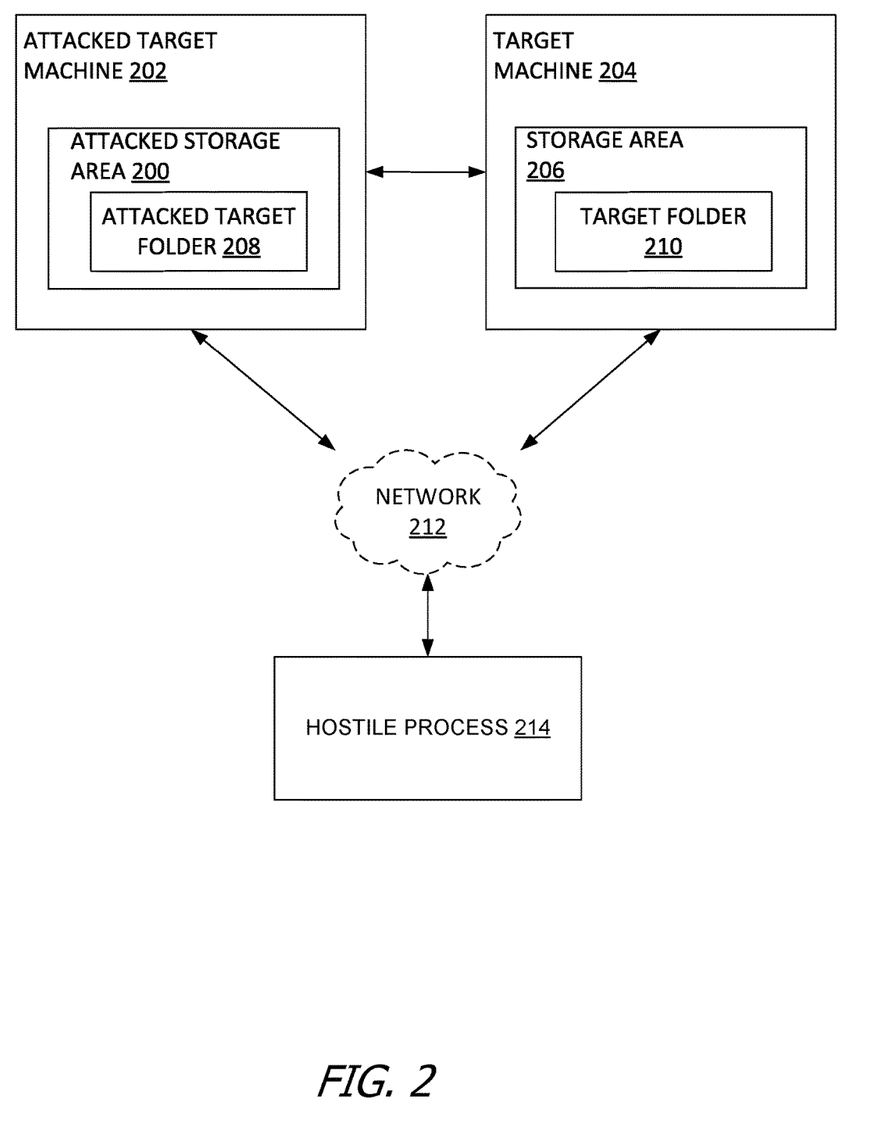
FIG. 2 is a block diagram of a system, over which a hostile process accesses and attacks target machines.

FIG. 2 is a block diagram of a system, such as a network 212 of host computing devices 100, over which a hostile process accesses and attacks target host computing devices 100. FIG. 2 further shows how target devices communicate with each other to share information relating to attack attempts.

In the example diagram of FIG. 2, a hostile process 214, such as malware, ransomware, crypto-ransomware, or other virus-like process, attempts to target files on remotely located host computing devices 100 (illustrated in FIGS. 1, 8, and 9), over a network 212. In the example of FIG. 2, two machines (e.g., host computing devices 100 or virtual machines) are illustrated. The hostile process 214 already attacked the first machine, referred to as an attacked target machine 202, but the disclosure has determined the hostile process 214 to be ransomware. The hostile process 214 did not yet attack the second machine, referred to as a target machine 204. Both the attacked target machine 202 and the target machine 204 include a storage area (attacked storage area 200 and storage area 206) which hosts an attacked target folder 208 and a target folder 210 (collectively the "target folders"), respectively. The attacked target machine 202 and the target machine 204 (collectively the "target machines" are illustrated in more detail in FIGS. 1 and 9. The target folders are, in some examples, directories or other file system structures. In some examples, the target folders are maintained in memory; in others, they are stored on storage. The target folders are illustrated in more detail in FIG. 3.

In some examples, the attacked target machine 202 and the target machine 204 communicate through the network 212. In other embodiments, the attacked target machine 202 and the target machine are connected directly, as in a peer-to-peer network. In either example, the attacked target machine 202 disseminates warnings, alerts, alarms, etc. to the target machine 204 and other target machines (not illustrated) connectively communicating with the attacked target machine. In other examples, data such as attack patterns, attack frequency, attack time, attack method, etc. are collected by either the attacked target machine 202 or other host computing devices 100 connected to the attacked target machine 202. In those examples, a database, list, file, etc. containing the data is available to other target machines 204 over the network.

Figure 3:
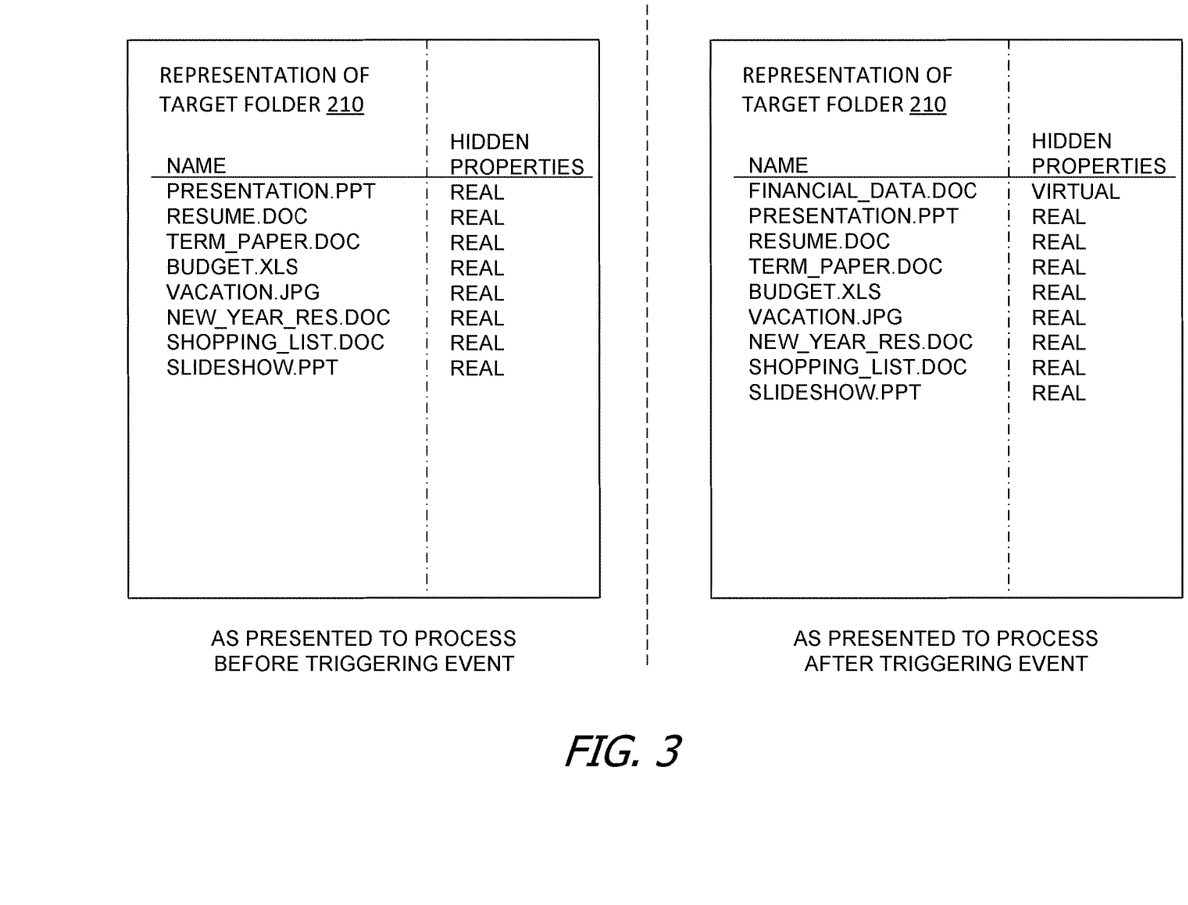
FIG. 3 is a representation of a target folder before and after a triggering event, such as an attack by the hostile process, occurs.

FIG. 3 is a representation of a target folder, as presented by the filter driver 110 in response to a query from a process. The filter driver 110 retrieves and sorts the contents of the target folder 210 for presentation to a requesting process. As an example, a user opens a folder using a file explorer application. The filter driver 110 retrieves the files, sorts them, and presents them to the file explorer application for display to the user. The filter driver 110 presents the contents of the target folder 210 to the requesting process. FIG. 3 shows the contents both before and after an event triggering the disclosed method (such as a query on the contents of the target folder 210) occurs.

The left side of FIG. 3 illustrates the representation of the target folder 210 before the triggering event occurs. The right side of FIG. 3 illustrates the representation of the target folder 210 after the triggering event occurs. The representations of the target folder 210 include the names of the files in the target folder 210 and the attributes of the files (not illustrated). FIG. 3 also includes hidden properties, which would not be displayed to the process 108 by default. The block diagram in FIG. 3 is not the actual target folder 210, but rather the representation of a set of files in the target folder 210, which is presented to the process 108 upon request from the process 108. In the target folder 210 before the triggering event, the representation of the target folder 210 includes only real files (e.g., corresponding to files that have content in the target folder 210). On the right side of FIG. 3, the representation of the target folder 210 after the triggering event further includes a virtual file, with an example name of FINANCIAL_DATA.DOC.

The representation of the target folder 210 on the right, as presented after the triggering event, illustrates that the filter driver 110 has returned the virtual file to the process 108 in response to a triggering event. As an example, if an unknown process performs a query on the file contents of the target folder 210, a virtual file is returned as part of the set of files in the target folder 210. In some examples, the virtual file is not actually located on the target folder 210. That is, the virtual file does not actually have any contents, but is just metadata returned upon receiving the search query from the process 108. Instead, the filter driver 110 spoofs the virtual file to the process 108 (illustrated in more detail in FIG. 5 and described in the accompanying text). Because the virtual file is only presented upon a request from the process 108, the virtual file is not shown to the user.

In other examples, the virtual file does have content, and thus is a typical file in the target folder 210, but remains hidden from known or authorized users.

Figure 5:
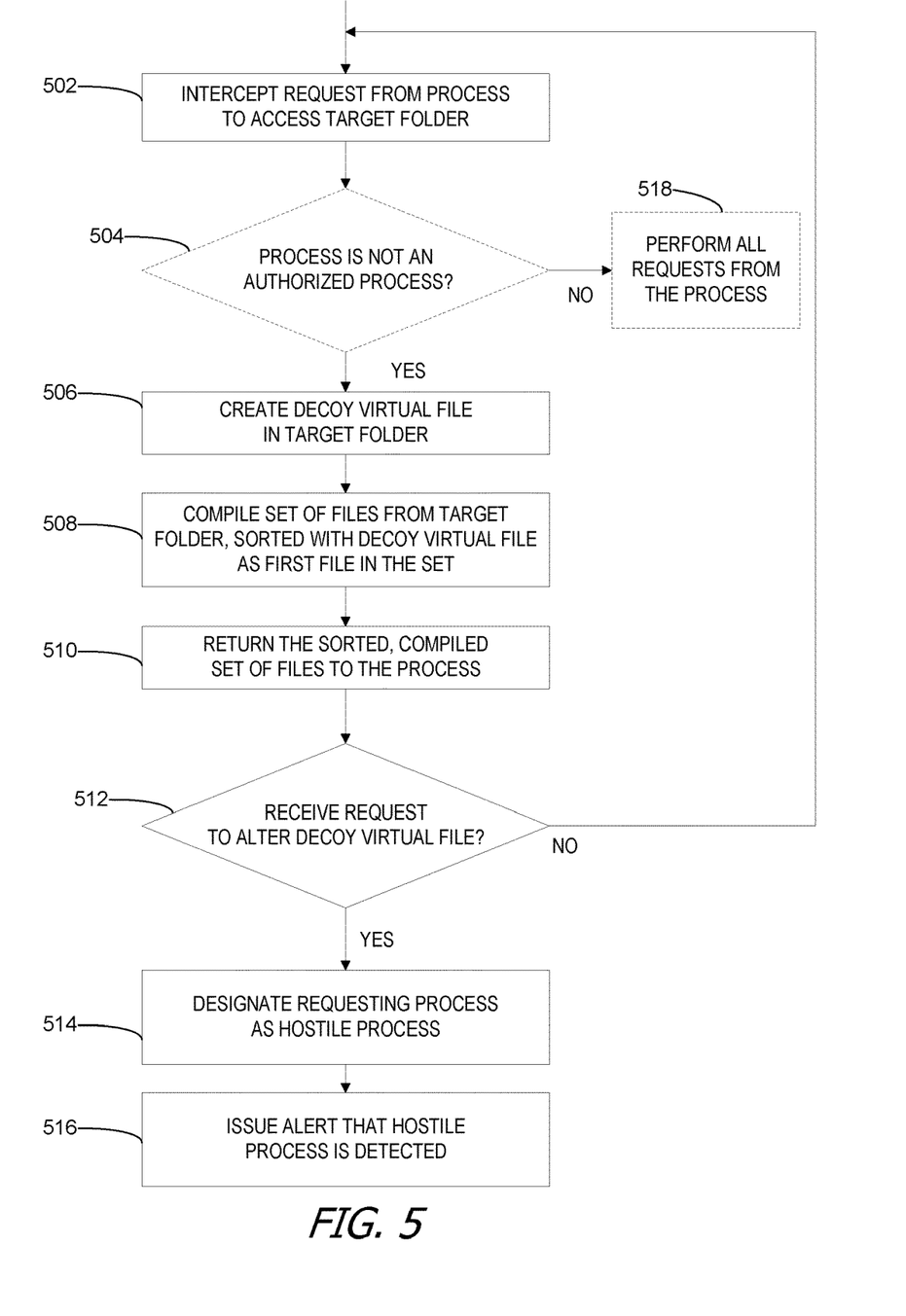
FIG. 5 is a flowchart of another exemplary method performed by a filter driver to detect and prevent attacks to a target folder by a hostile process.

In other examples, the triggering event is the creation of a first file of an identified file type in the target folder 210 (illustrated in more detail in FIG. 5, and described in the accompanying text). As an example, a user saves a presentation file, with the extension ".ppt." In this example, this is the first .ppt file saved in the target folder 210. This file creation constitutes the triggering event. As a result of the triggering event, a virtual file of extension type .ppt is presented to the process.

Target folders 210 are specified, in some examples, by a user or an administrator. They may also be federated in a policy. As an example, the policy specifies that the "My Documents" folder is a target folder 210 of interest. In that example, the disclosed method targets the "My Documents" folder for protection, instead of all of the folders. Alternatively, all of the folders are considered target folders 210 and are thus included for protection.

The representations illustrated in FIG. 3 are disclosed to the process 108 when an application issues a command on the target folder 210, such as a query for a directory. When the lookup completes and returns a set of files, the filter driver 110 manipulates the returned set of files by inserting the virtual file at the beginning of the set of files. The filter driver 110 also, in some examples, inserts the name of the virtual file into a prefix-table tree so that the filter driver 110 may refer to it later. In some examples, the name is stored for the duration of a session with the process 108. The duration of a session is determined in accordance with a policy. As an example, a session is considered complete when more than ten minutes has elapsed since the last query from the process 108. If a heuristic analysis of attack patterns determines that the process 108 delays an attack for a time greater than ten minutes, then the policy is adjusted to reflect the analyzed session duration link. For a target folder 210 containing thousands of files, a query directory command may return result sets many times. In such examples, the virtual file is inserted into the results only once per target folder 210 during a query directory session.

Figure 4:
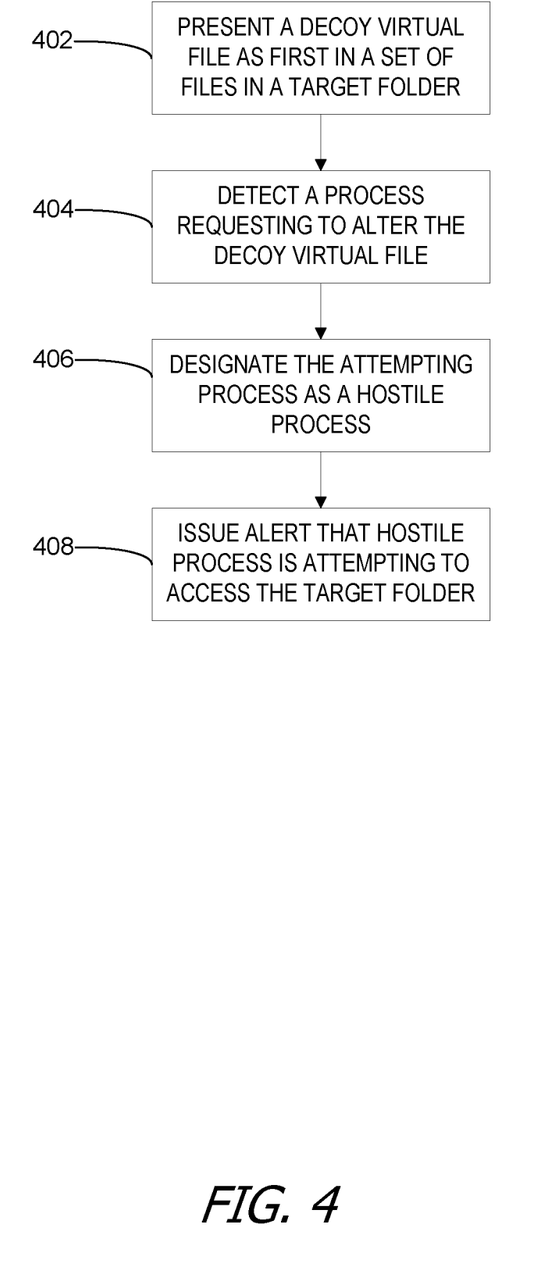
FIG. 4 is a flowchart of an exemplary method performed by a filter driver to detect and prevent attacks to a target folder by a hostile process.

FIG. 4 is a flowchart of an exemplary method performed by the filter driver 110 to detect and prevent attacks to a target folder by a hostile process. At 402, the filter driver 110 presents to the process 108 a virtual file as the first file in a set of files in a target folder 210. As described above, in FIG. 3, the virtual file is not actually created as file with content, but is spoofed by the filter driver 110. In alternative embodiments, the virtual file is created in the target folder 210 with some dummy content, but is hidden from users and only presented as part of the set of files in the target folder 210 when the target folder 210 is accessed by the process 108. In some embodiments, presenting the virtual file further includes generating a name and generating a size for the virtual file. The name and size are stored as metadata. The name and size may be randomly generated, in some examples, to prevent the process 108 from determining that the virtual file is not a file of interest to a user. As an alternative to randomly generating the size of the virtual file, the size is generated, in some examples, by applying an algorithm to the name of the file. As an example, if the virtual file name is 12345.docx, then 12345 is divided by 24 and the reminder (e.g., 9) is added to 1000. As a result, the size of the file is randomly determined to be 1009. This method helps ensure a random size between 1000 and 1024. Also, the filter driver 110 can calculate the size of the virtual file again from its name without storing the size.

At 404, the filter driver 410 detects a request from the process 108 to alter the virtual file. Because the virtual file is either non-existent, as in the example where the virtual file is spoofed by the filter driver 110, or it is hidden to the user, any attempt to modify the virtual file is interpreted as an unauthorized attempt. Consequently, at 406, the filter driver 410 designates the requesting process 108 as a hostile process 214, based upon the unauthorized attempt.

In some examples, the filter driver 410 issues, sounds, notifies, presents, or otherwise communicates an alert that the hostile process 214 is detected. Issuing the alert, in some examples, includes locking all files (in the target folder 210 or others) for read-only access. Alternatively, the filter device 110 receives or access instructions such as a policy or protocol that includes instructions to be executed upon designating the process 108 as a hostile process 214. Those instructions may be federated by an administrator, in some examples. In some embodiments, the instructions are stored in a crowd-sourced database, stored in memory or on storage, or otherwise accessible to the filter driver 110.

In some examples, the policy includes instructions directing the filter driver 110 to perform an action, for instance one or more of the following: suspend input/output (I/O) operations to the target folder 210, suspend I/O operations to a plurality of target folders accessible by the filter driver 110, suspend I/O operations to the set of files, notify the administrator of the detection of the hostile process 214, terminate hostile process, power-down a host computing device 100 associated with the filter driver 110, terminate a network connection, or suspend a virtual machine associated with the filter driver 110. The policy further includes, in some examples, instructions to protect other assets connectively communicating with the attacked target machine 202.

FIG. 5 is a flowchart of another exemplary method performed by the filter driver 110 to detect and prevent attacks to a target folder by the hostile process 214. At 502, the filter driver 110 intercepts a first request from the process 108 to access a target folder 210. At 504, the filter driver 110 optionally evaluates whether the process 108 is an authorized process. In some examples, the memory area storing the filter driver 110 also stores an authorized process list (e.g., a whitelist), or a policy, which is comprised of at least one process a user has identified as not hostile. The policy or the list is federated, in some examples, by an administrator, or otherwise shared with other machines. In some examples, as a new application is installed, then the new application is added to the authorized process list by the administrator or user. In other examples, a crowd-sourced database is accessed by the filter driver 110. The filter driver 108 compares the process 108 to the authorized process list to determine if the process 108 is included in the authorized process list. If the process 108 is on the authorized process list, the process 108 is designated as not hostile, and the requests from the process 108 are performed at 518. That is, the virtual file is not included in results returned to the process 108.

If the process 108 is not on the authorized process list at 504, then the filter driver 110 creates the virtual file in the target folder 210 (the creation of the virtual file is described in more detail in the text accompanying FIG. 4).

At 508, the filter driver 110 compiles a set of files from the target folder 210 based on the intercepted first request, and in some examples sorts the compiled set of files to place the created virtual file first in the set. In other examples, the compiled set of files is not sorted, but instead the virtual file is placed first in the compiled set of files. That is, the filter driver 110 does not sort the complete file list from the filesystem, in this example.

While in this example the virtual file is placed first in the set, the virtual file may be placed in other positions. In some embodiments, the filter driver 110 further generates, for the virtual file, attributes such as a size, a name, a date of creation, and an author. These attributes are edited, in some examples, based upon the type of sort performed on the set of files. As an example, if the process 108 requested the files sorted based upon a date of creation, then the virtual file is given a date of creation earlier than all of the other files, which results in the virtual file being placed first in the set of sorted files.

At 510, the filter driver 110 returns the compiled set of files to the process. At 512, if the filter driver 110 receives a second request from the process 108 (or any other process 108) to write to the virtual file, then the filter driver 110 designates the process 108 as a hostile process 214 at 514 (without performing the write to the virtual file).

Upon designating the process 108 as hostile, the filter driver 110 issues an alert that the hostile process 214 is detected. In some examples, issuing the alert by the filter driver 110 entails the filter driver 110 notifying other host computing devices 100 of the attack by the hostile process 214. The filter driver 110 disseminates, as an example, the characteristics of the hostile process 214, such as an attack pattern. Alternatively, if the filter driver 110 receives an alert from at least one of the host computing devices 100 in the network, then the filter driver 110 responds, in some examples, by locking the target folder 210.

Figure 6:
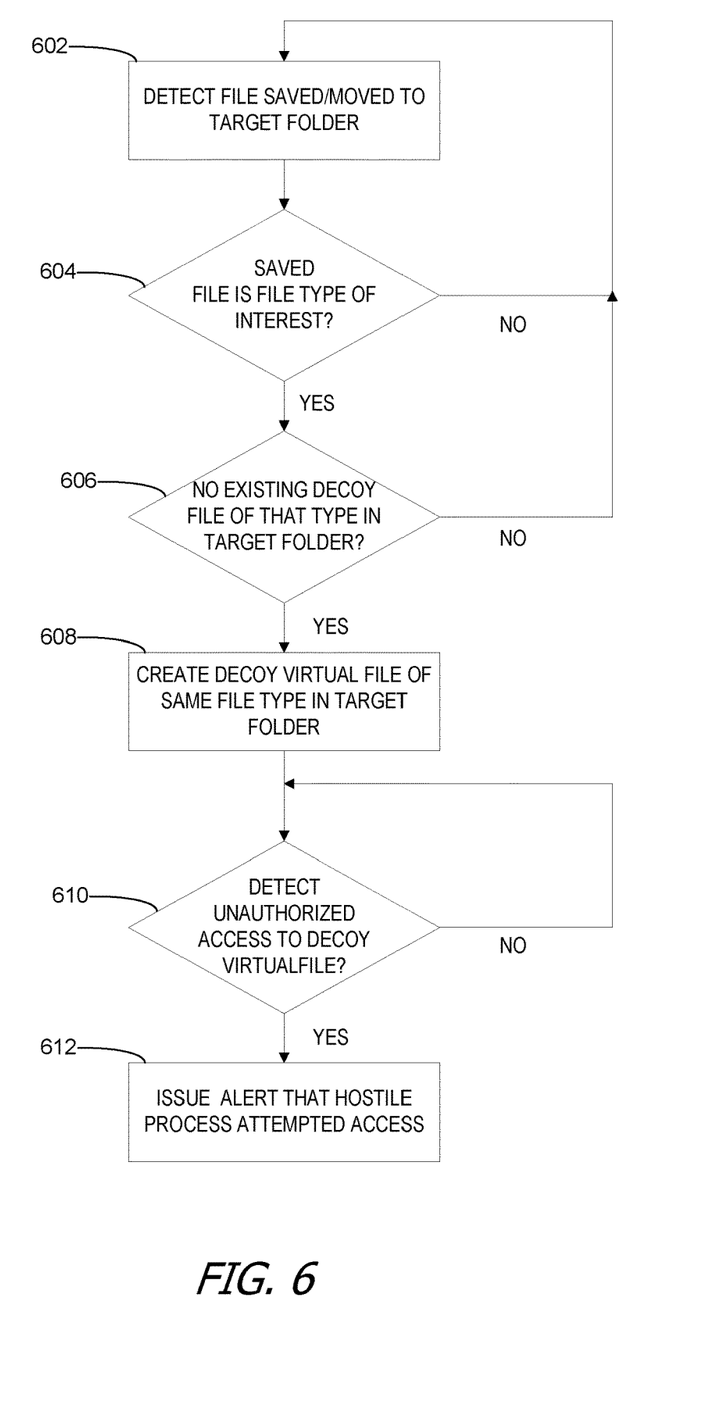
FIG. 6 is a flowchart of an exemplary method performed by a filter driver to detect and prevent attacks to a file type of interest by a hostile process.

FIG. 6 is a flowchart of an exemplary method performed by a filter driver to detect and prevent attacks to a file type of interest by the hostile process 214. In the example of FIG. 6, as distinguished from FIG. 5, the virtual file is created based upon detecting the creation of a file of interest. At 602, the filter driver 110 detects that a file is saved or moved to the target folder 210. At 604, the filter driver 110 evaluates whether the first file is a file of a targeted file type from a set of targeted file types in the target folder 210. The targeted file types are identified, in some examples, by a user or administrator, or in a policy or protocol. High value files are identified. For instance, file types such as documents, spreadsheets, photos, or presentations are identified as the targeted file types. The filter driver 110 detects the first file when a file of the targeted type is initially created or moved into the target folder 210 (e.g., saved to the target folder 210).

If the file is a targeted file type, then it is of interest, and the filter driver 110 evaluates whether an existing virtual file of that file type is in the target folder 210 at 606. The filter driver 110 creates only one virtual file of each targeted file type per target folder 210, in some examples. Upon determining that no existing virtual file of that file type exists, the filter driver 110 creates a virtual file of the targeted file type in the target folder 210, at 608. At 610, the filter driver 10 evaluates whether an unauthorized access attempt is made to the virtual file. If the access attempt is unauthorized, then the filter driver 110 designates the process 108 as the hostile process 214, and issues an alert that the hostile process 214 has been detected to the user or administrator at 612.

In some examples, the filter driver 110 heuristically analyzes an attack, from a known hostile process 214, to identify an access pattern. Identifying the access pattern may include identifying a first attacked position (e.g., if the file attacked first is in the last position in the list, or in the middle of the list, etc., instead of the first file). In some examples, identifying the access pattern may include identifying the sort method used by the hostile process 214. In such examples, the filter driver 110 sorts the compiled set of files in accordance with the heuristically determined sort method, and places the virtual file in the first attacked position. In an example where an alternative sort method is used, the filter driver 110 generates attributes for the virtual file based upon the sort method, such that the virtual file is always sorted into the most likely position to be attacked. As an alternative to heuristic analysis, the filter driver 110 designates a process 108 as the hostile process 214 based upon a policy, a feedback loop, or a database accessed across a network.

Figure 7:
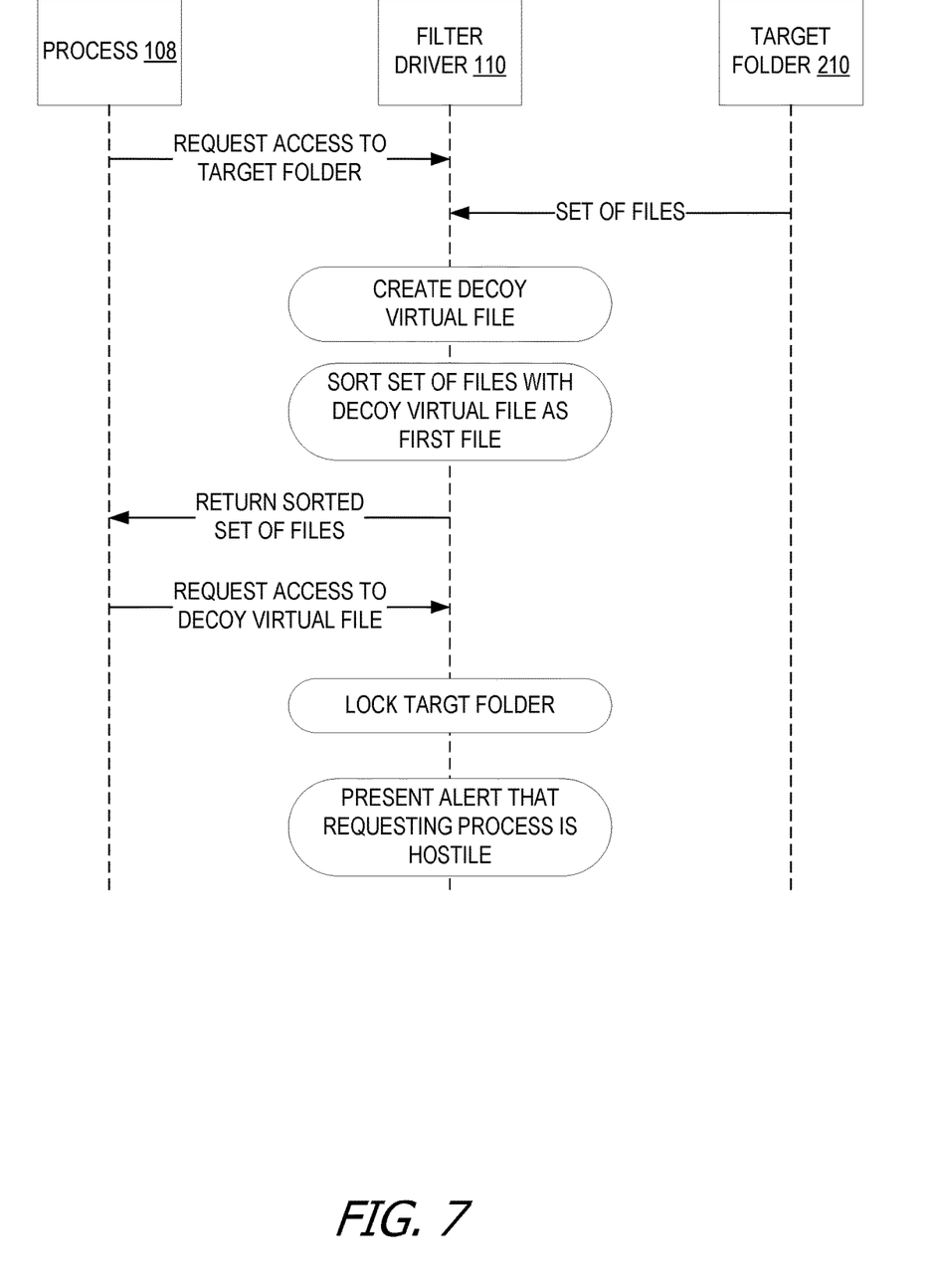
FIG. 7 is a sequence diagram illustrating the operations performed on the target folder by the hostile process and the filter driver.

FIG. 7 is a sequence diagram illustrating the operations performed on the target folder 210 by the hostile process 214 and the filter driver 110. The operations illustrated in FIG. 7 are described in more detail, above, in FIGS. 4 and 5. Initially, the process 108 requests access to a target folder 210. The request is intercepted by the filter driver 110. The filter driver 110 relays the request to the target folder 210, in some examples as a query directory request. A set of files in the target folder 210 is returned to the filter driver 110 in response to the request. The filter driver 110 creates the virtual file (if the virtual file has not already been created), and sorts the set of files such that the virtual file is the first file in the set. The filter driver 110 then returns the sorted set of files to the process 108. In the illustrated example, the process 108 subsequently requests access to the virtual file, such as to make an encrypted write to the file. This triggers the filter driver 110 to lock the target folder 210 to edits. Additionally, the filter driver 110 presents an alert that the process 108 is the hostile process 214.

Figure 8:
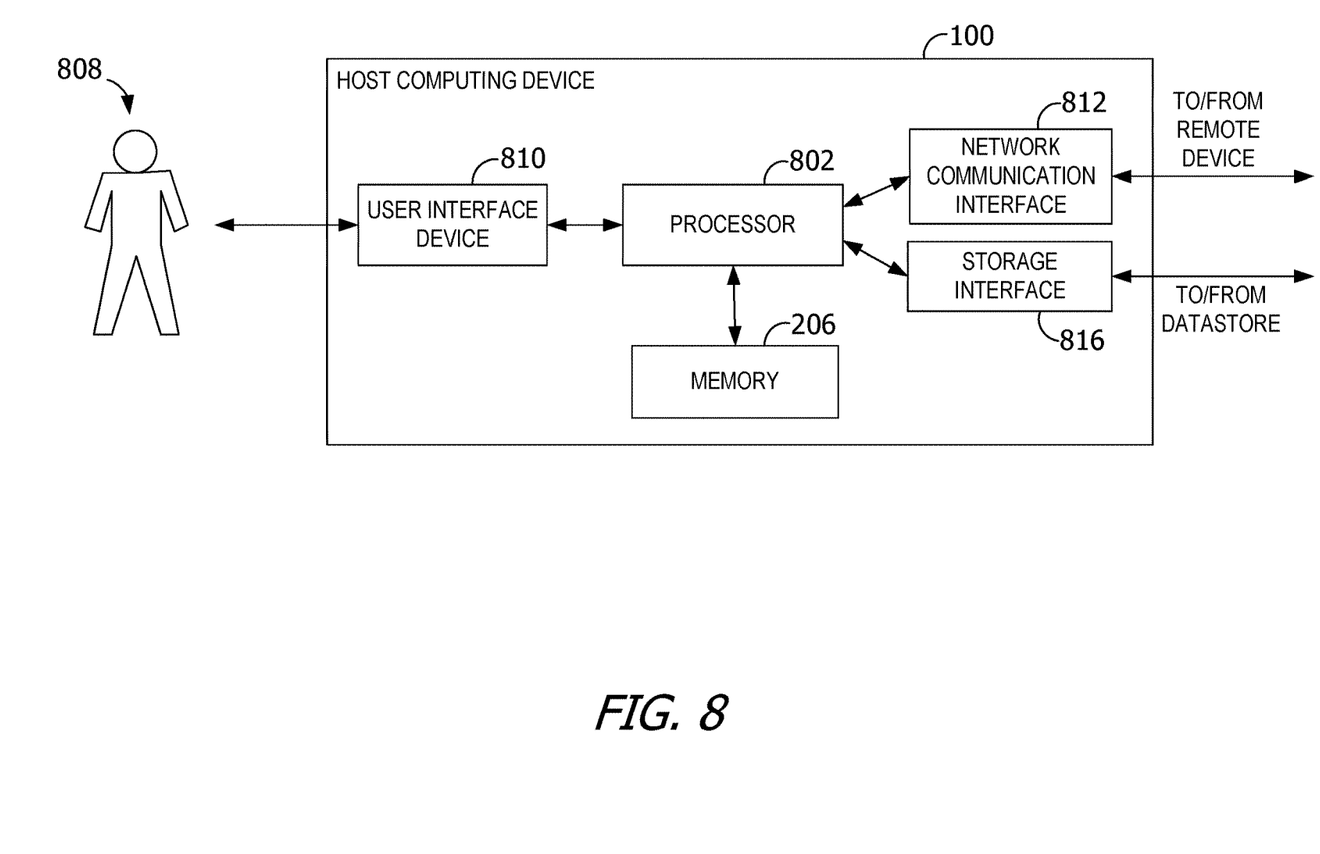
FIG. 8 is a block diagram of an exemplary host computing device.

FIG. 8 is a block diagram of an example host computing device 100. Host computing device 100 includes a processor 802 for executing instructions. In some examples, executable instructions are stored in a memory 206. Memory 206 is any device allowing information, such as executable instructions and/or other data, to be stored and retrieved. For example, memory 206 may include one or more random access memory (RAM) modules, flash memory modules, hard disks, solid state disks, and/or optical disks.

Host computing device 100 may include a user interface device 810 for receiving data from a user 808 and/or for presenting data to user 808. User 808 may interact indirectly with host computing device 100 via another computing device such as a device running VMware's vCenter Server or other management device. User interface device 810 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 810 operates to receive data from user 808, while another device (e.g., a presentation device) operates to present data to user 808. In other examples, user interface device 810 has a single component, such as a touch screen, that functions to both output data to user 808 and receive data from user 808. In such examples, user interface device 810 operates as a presentation device for presenting information to user 808. In such examples, user interface device 810 represents any component capable of conveying information to user 808. For example, user interface device 810 may include, without limitation, a display device (e.g., a liquid crystal display (LCD), organic light emitting diode (OLED) display, or "electronic ink" display) and/or an audio output device (e.g., a speaker or headphones). In some examples, user interface device 810 includes an output adapter, such as a video adapter and/or an audio adapter. An output adapter is operatively coupled to processor 802 and configured to be operatively coupled to an output device, such as a display device or an audio output device.

Host computing device 100 also includes a network communication interface 812, which enables host computing device 100 to communicate with a remote device (e.g., another computing device) via a communication medium, such as a wired or wireless packet network. For example, host computing device 100 may transmit and/or receive data via network communication interface 812. User interface device 810 and/or network communication interface 812 may be referred to collectively as an input interface and may be configured to receive information from user 808.

Host computing device 100 further includes a storage interface 816 that enables host computing device 100 to communicate with one or more data storage devices, which store virtual disk images, software applications, and/or any other data suitable for use with the methods described herein. In example examples, storage interface 816 couples host computing device 100 to a storage area network (SAN) (e.g., a Fibre Channel network) and/or to a network-attached storage (NAS) system (e.g., via a packet network). The storage interface 816 may be integrated with network communication interface 812.

FIG. 9 depicts a block diagram of virtual machines $935_1$, $935_2$ ... $935_N$ that are instantiated on host computing device 100. Host computing device 100 includes a hardware platform 905, such as an x86 architecture platform. Hardware platform 905 may include processor 802, memory 206, network communication interface 812, user interface device 810, and other input/output (I/O) devices, such as a presentation device 806 (shown in FIG. 8). A virtualization software layer, also referred to hereinafter as a hypervisor 910, is installed on top of hardware platform 905.

The virtualization software layer supports a virtual machine execution space 930 within which multiple virtual machines (VMs $935_1$-$935_N$) may be concurrently instantiated and executed. Hypervisor 910 includes a device driver layer 915, and maps physical resources of hardware platform 905 (e.g., processor 802, memory 206, network communication interface 812, and/or user interface device 810) to "virtual" resources of each of VMs $935_1$-$935_N$ such that each of VMs $935_1$-$935_N$ has its own virtual hardware platform (e.g., a corresponding one of virtual hardware platforms $940_1$-$940_N$), each virtual hardware platform having its own emulated hardware (such as a processor 945, a memory 950, a network communication interface 955, a user interface device 960 and other emulated I/O devices in VM $935_1$). Hypervisor 910 may manage (e.g., monitor, initiate, and/or terminate) execution of VMs $935_1$-$935_N$ according to policies associated with hypervisor 910, such as a policy specifying that VMs $935_1$-$935_N$ are to be automatically restarted upon unexpected termination and/or upon initialization of hypervisor 910. In addition, or alternatively, hypervisor 910 may manage execution VMs $935_1$-$935_N$ based on requests received from a device other than host computing device 100. For example, hypervisor 910 may receive an execution instruction specifying the initiation of execution of first VM 9351 from a management device via network communication interface 812 and execute the execution instruction to initiate execution of first VM $935_1$.

In some examples, memory 950 in first virtual hardware platform 9401 includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $935_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 915 includes, for example, a communication interface driver 920 that interacts with network communication interface 812 to receive and transmit data from, for example, a local area network (LAN) connected to host computing device 100. Communication interface driver 920 also includes a virtual bridge 925 that simulates the broadcasting of data packets in a physical network received from one communication interface (e.g., network communication interface 812) to other communication interfaces (e.g., the virtual communication interfaces of VMs $935_1$-$935_N$). Each virtual communication interface for each VM $935_1$-$935_N$, such as network communication interface 955 for first VM $935_1$, may be assigned a unique virtual Media Access Control (MAC) address that enables virtual bridge 925 to simulate the forwarding of incoming data packets from network communication interface 812. In an example, network communication interface 812 is an Ethernet adapter that is configured in "promiscuous mode" such that all Ethernet packets that it receives (rather than just Ethernet packets addressed to its own physical MAC address) are passed to virtual bridge 925, which, in turn, is able to further forward the Ethernet packets to VMs $935_1$-$935_N$. This configuration enables an Ethernet packet that has a virtual MAC address as its destination address to properly reach the VM in host computing device 100 with a virtual communication interface that corresponds to such virtual MAC address.

Virtual hardware platform $940_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 965 in order to execute applications 970 for an instantiated VM, such as first VM $935_1$. Virtual hardware platforms $940_1$-$940_N$ may be considered to be part of virtual machine monitors (VMM) $975_1$-$975_N$ that implement virtual system support to coordinate operations between hypervisor 910 and corresponding VMs $935_1$-$935_N$. Those with ordinary skill in the art will recognize that the various terms, layers, and categorizations used to describe the virtualization components in FIG. 9 may be referred to differently without departing from their functionality or the spirit or scope of the disclosure. For example, virtual hardware platforms $940_1$-$940_N$ may also be considered to be separate from VMMs $975_1$-$975_N$, and VMMs $975_1$-$975_N$ may be considered to be separate from hypervisor 910. One example of hypervisor 910 that may be used in an example of the disclosure is included as a component in VMware's ESX brand software, which is commercially available from VMware, Inc.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special purpose computing device when programmed to execute the instructions described herein.

The embodiments illustrated and described herein as well as embodiments not specifically described herein but within the scope of aspects of the invention constitute exemplary means for detecting and preventing hostile attacks by ransomware and malware. The instructions executed by the filter driver, the host computing device, a memory, and/or a processor constitute exemplary means to spoof virtual files to requesting processes. Upon receiving requests to access (e.g. write to) the virtual files, the filter driver is programmed to identify the requesting process as a hostile process, and alert a user, administrator, or other entity of an unauthorized access attempt.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A method for preventing unauthorized file access, the method comprising:
   heuristically analyzing an attack to identify an access pattern, the access pattern comprising a sort method and a first attacked position;
   intercepting a first request from a process to access a target folder;
   in response to intercepting the first request, creating a virtual file;
   compiling a set of files from the target folder based on the intercepted first request;
   sorting the compiled set of files in accordance with the sort method;
   placing the virtual file in the first attacked position in the set;
   returning the sorted, compiled set of files to the process; and
   upon receiving a second request from the process to alter the virtual file, designating the process as a hostile process.

2. The method of claim 1, wherein designating the process as a hostile process comprises locking one or more files for read-only access by the process.

3. The method of claim 1, further comprising accessing a policy comprising instructions to be executed upon designating the process as the hostile process.

4. The method of claim 3, wherein the policy instructs a filter driver to perform actions selected from a group consisting of suspending input/output (I/O) operations to the target folder, suspending I/O operations to a plurality of target folders accessible by the filter driver, suspending I/O operations to the set of files, notifying administrator of the detection of the hostile process, powering-down a host computing device associated with the filter driver, terminating a network connection associated with the system, and suspending a virtual machine associated with the filter driver.

5. The method of claim 1, wherein placing the virtual file in the first attacked position comprises placing the virtual file first in the set.

6. The method of claim 5, wherein the created virtual file is hidden from a user.

7. The method of claim 1 further comprises presenting a name and a size for the virtual file, and wherein the size is generated by applying an algorithm to the name.

8. The method of claim 5, wherein the method further comprises storing the name for the duration of a session with the process.

9. A system, comprising:
   a processor; and
   a non-transitory computer readable medium having stored thereon program code for transferring data to another computer system, the program code causing the processor to:
   heuristically analyze an attack to identify an access pattern, the access pattern comprising a sort method and a first attacked position;
   intercept a first request from a process to access a target folder containing at least one file;
   in response to intercepting the first request, create a virtual file;
   compile a set of files from the target folder based on the intercepted first request;
   sort the compiled set of files in accordance with the sort method
   place the virtual file in the first attacked position in the set;
   return the sorted, compiled set of files to the process; and
   upon receiving a second request from the process to access the virtual file, designate the process as a hostile process.

10. The system of claim 9, wherein the memory area further stores an authorized process list comprising at least one process identified as not hostile.

11. The system of claim 10, wherein the program code further causes the processor to:
    compare the process to the authorized process list; and
    if the process is located on the authorized process list, allow the process to access the target folder without designating the process as the hostile process.

12. The system of claim 9, further comprising a plurality of host computing devices associated with the system, and wherein the program code further causes the processor to issue an alert to the plurality of host computing devices associated with the system.

13. The system of claim 12, wherein the program code further causes the processor to:
    receive an alert from at least one of the plurality of host computing devices, the alert identifying the hostile process; and
    based on the received alert, lock the target folder from access by the hostile process.

14. The system of claim 9, wherein placing the created virtual file in the first attacked position comprises placing the created virtual file first in the set.

15. The system of claim 9, wherein the created virtual file is hidden from a user.

16. The system of claim 9, wherein the program code further causes the processor to access a policy comprising instructions to be executed upon designating the process as the hostile process.

17. A non-transitory computer readable storage medium having stored thereon program code executable by a first computer system at a first site, the program code embodying a method comprising:
    heuristically analyzing an attack to identify an access pattern, the access pattern comprising a sort method and a first attacked position;
    intercepting a first request from a process to access a target folder;
    in response to intercepting the first request, creating a virtual file;
    compiling a set of files from the target folder based on the intercepted first request;
    sorting the compiled set of files in accordance with the sort method
    placing the virtual file in the first attacked position in the set;
    returning the sorted, compiled set of files to the process; and
    upon receiving a second request from the process to access the virtual file, designating the process as a hostile process.

18. The non-transitory computer-readable storage media of claim 17, wherein creating the virtual file comprises creating the virtual file once per target folder per a targeted file type.

19. The non-transitory computer-readable storage media of claim 17, wherein the created virtual file is hidden from a user.

20. The non-transitory computer-readable storage media of claim 17, wherein issuing the alert comprises notifying a computing device across a network.

\* \* \* \* \*